April 1, 1941.  R. C. EVANS  2,236,814
STREET SWEEPER AND DRIVING SYSTEM THEREFOR
Filed May 12, 1938  7 Sheets-Sheet 4
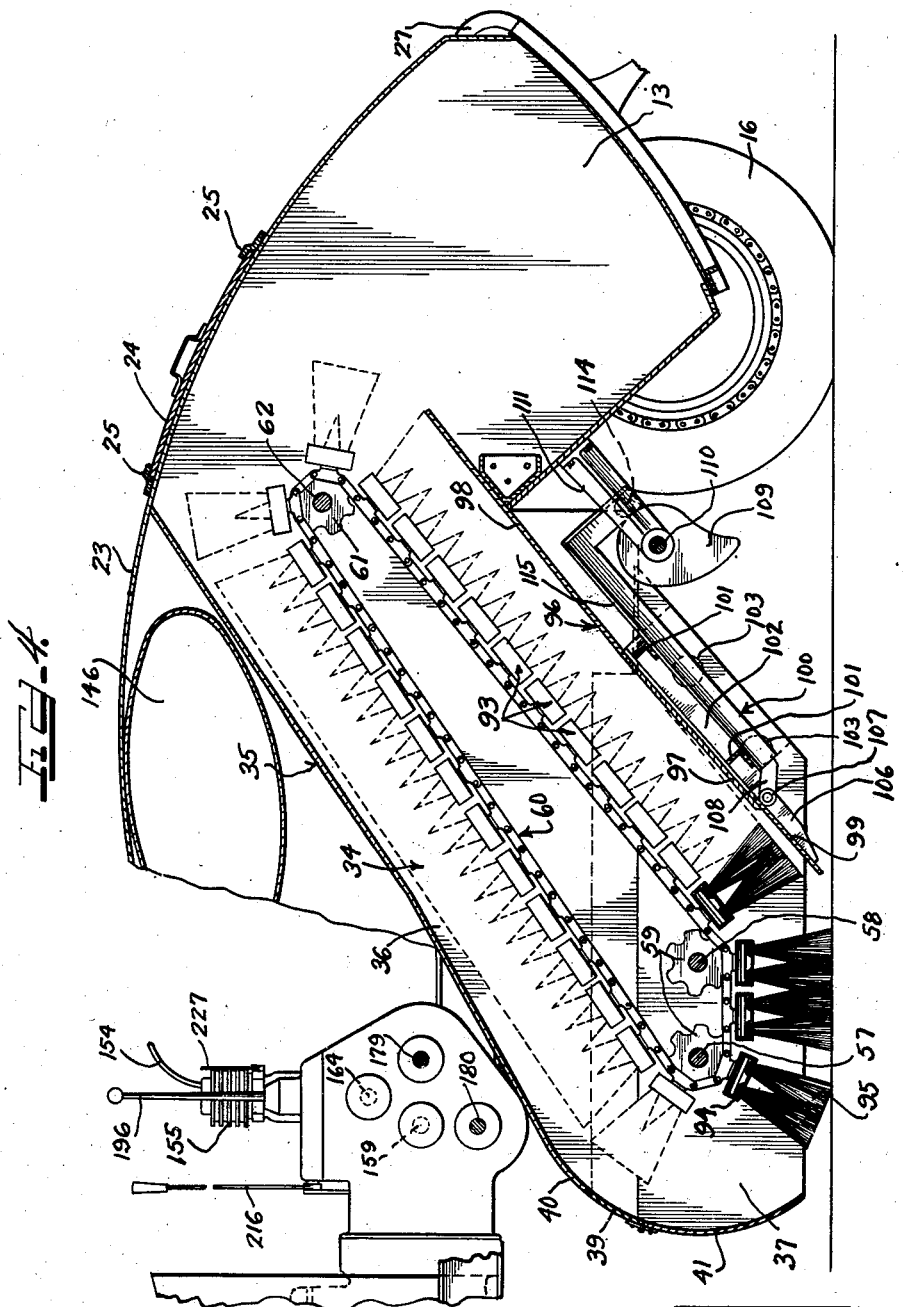
Inventor
RONALD CLEMENT EVANS.
by Charles Hill Attys.

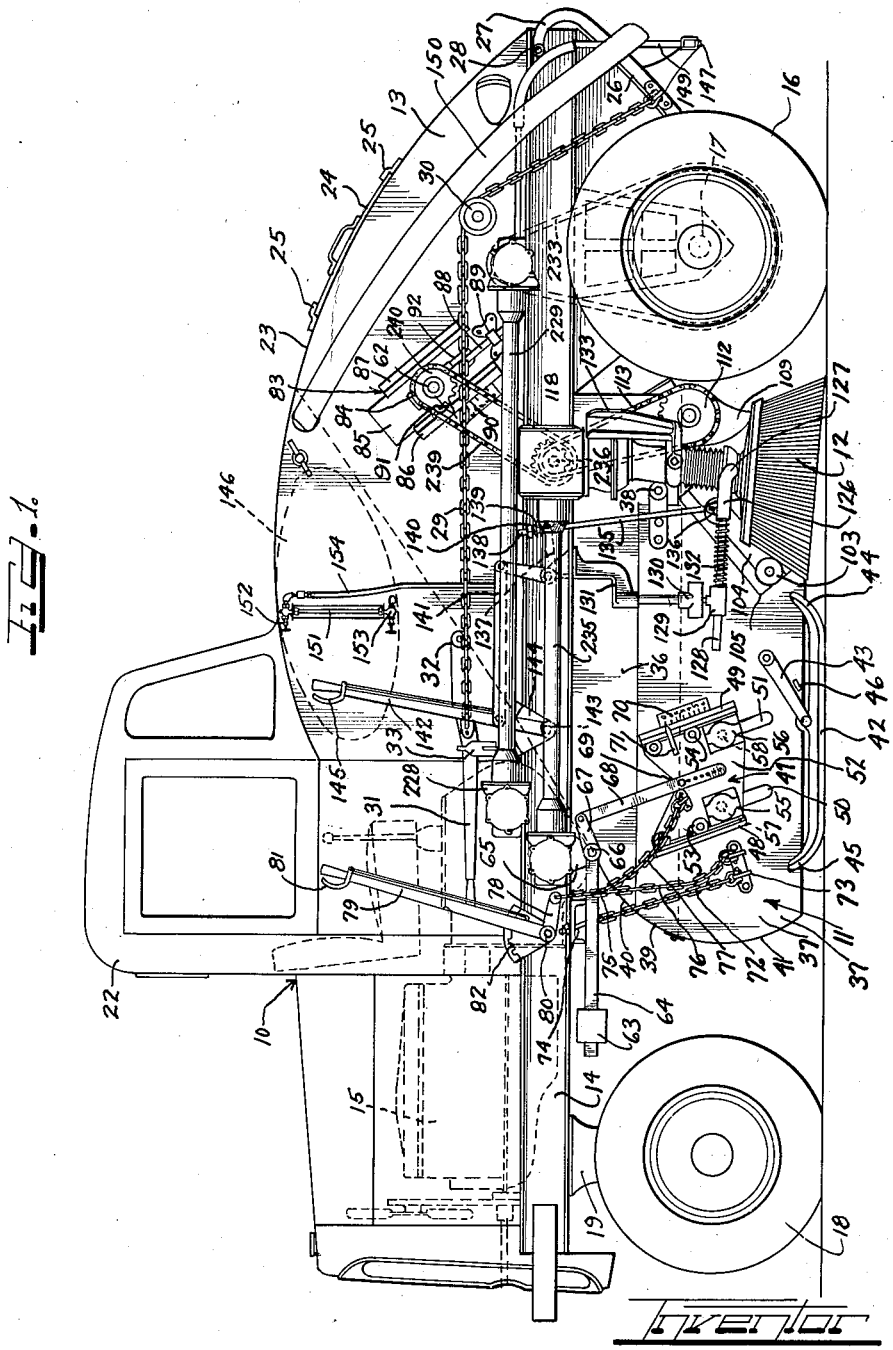

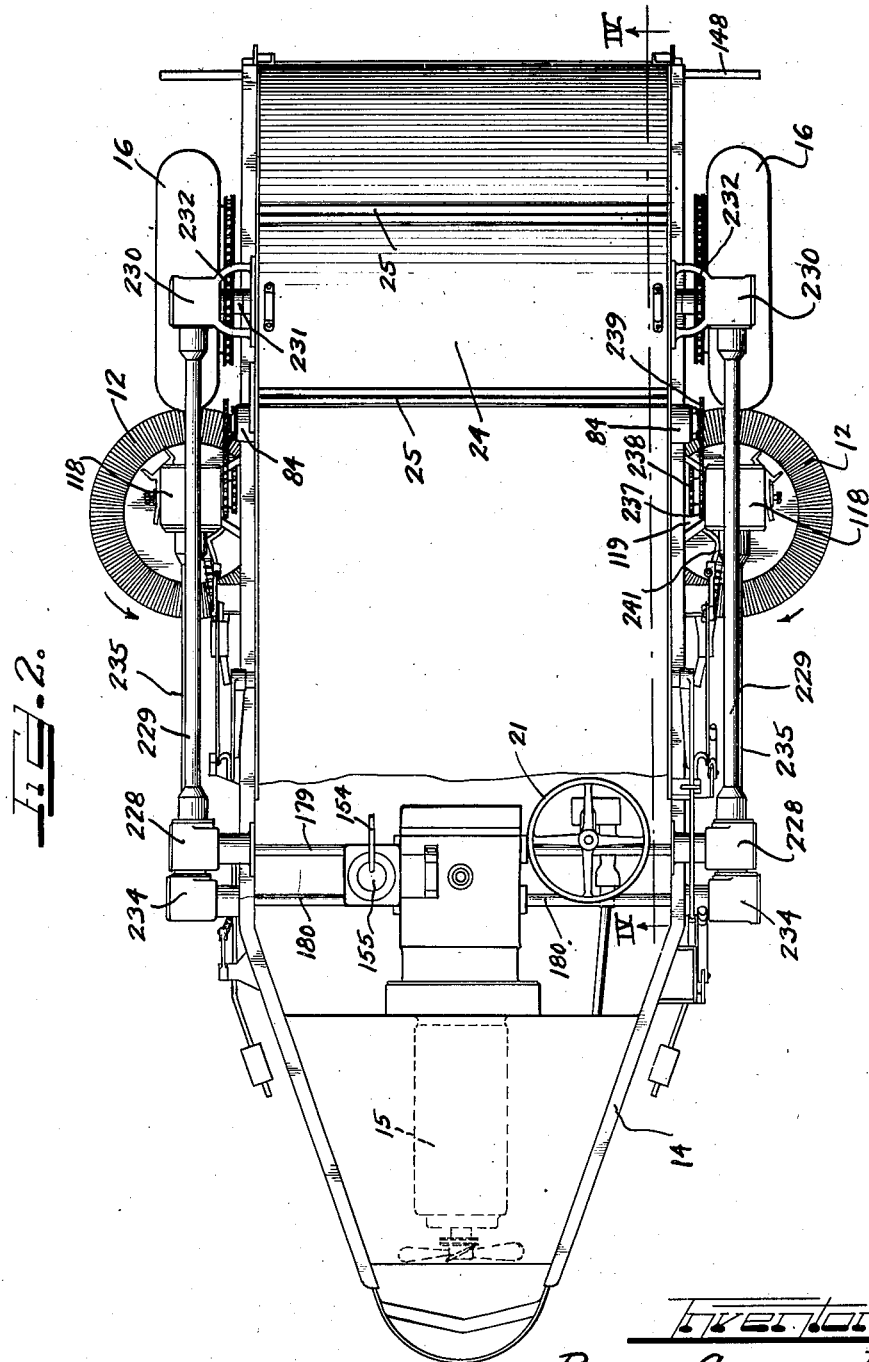

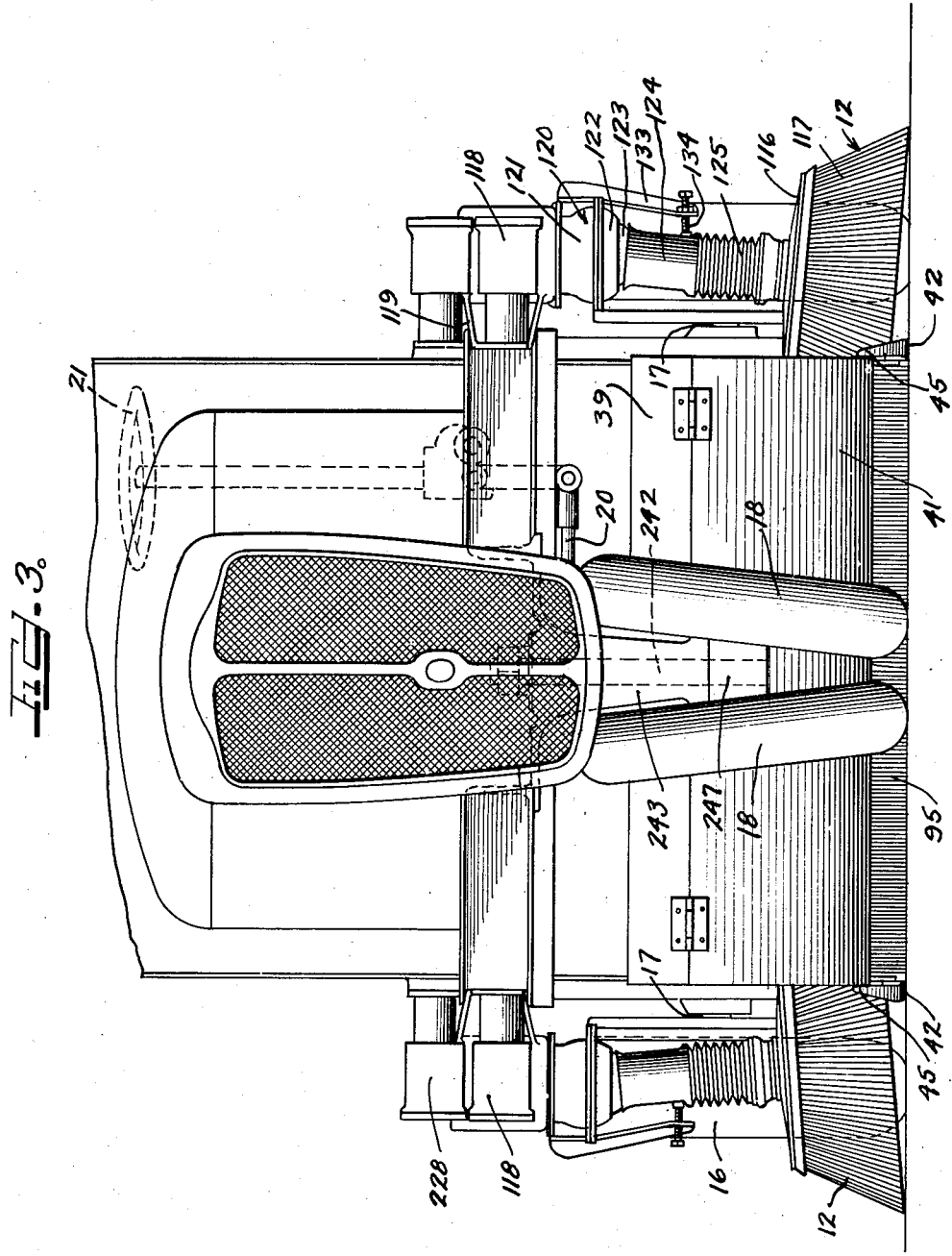

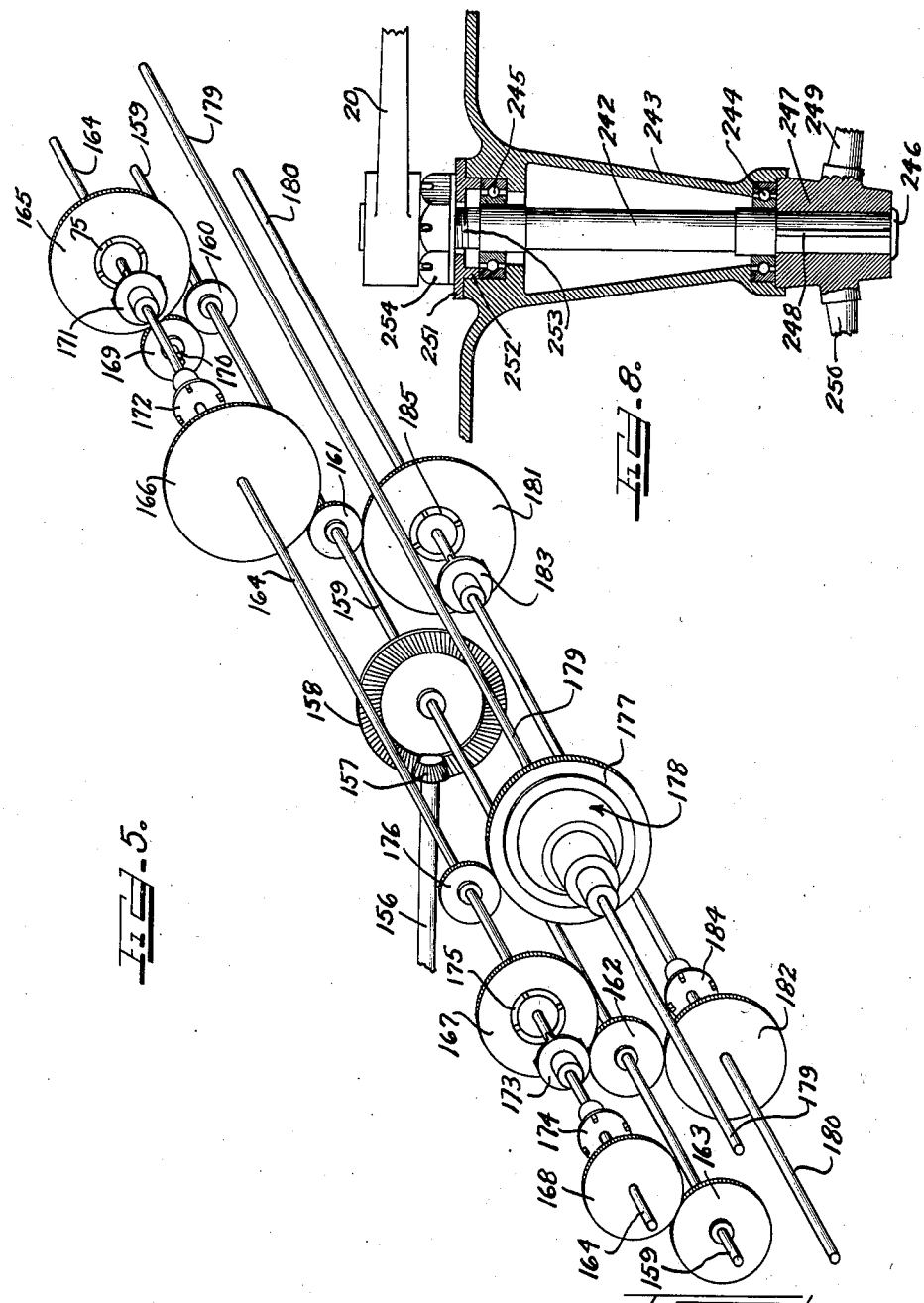

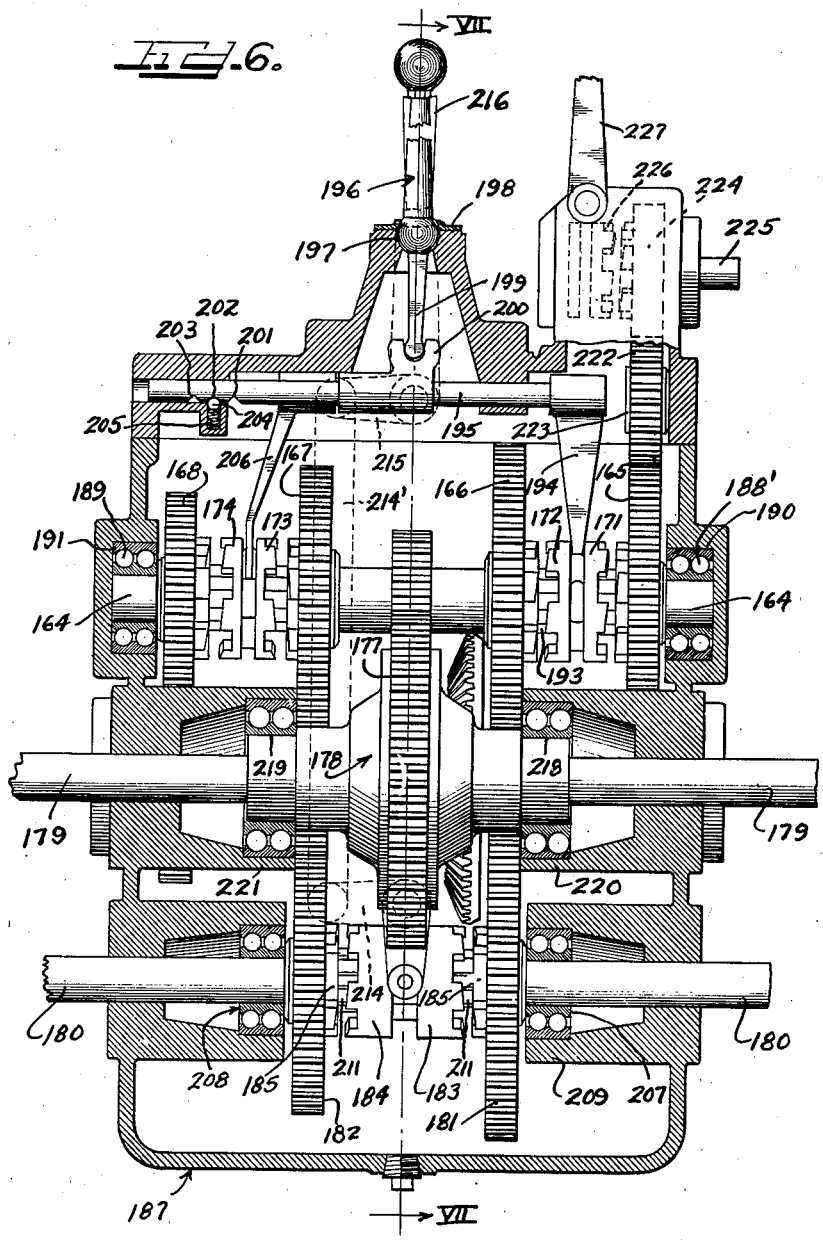

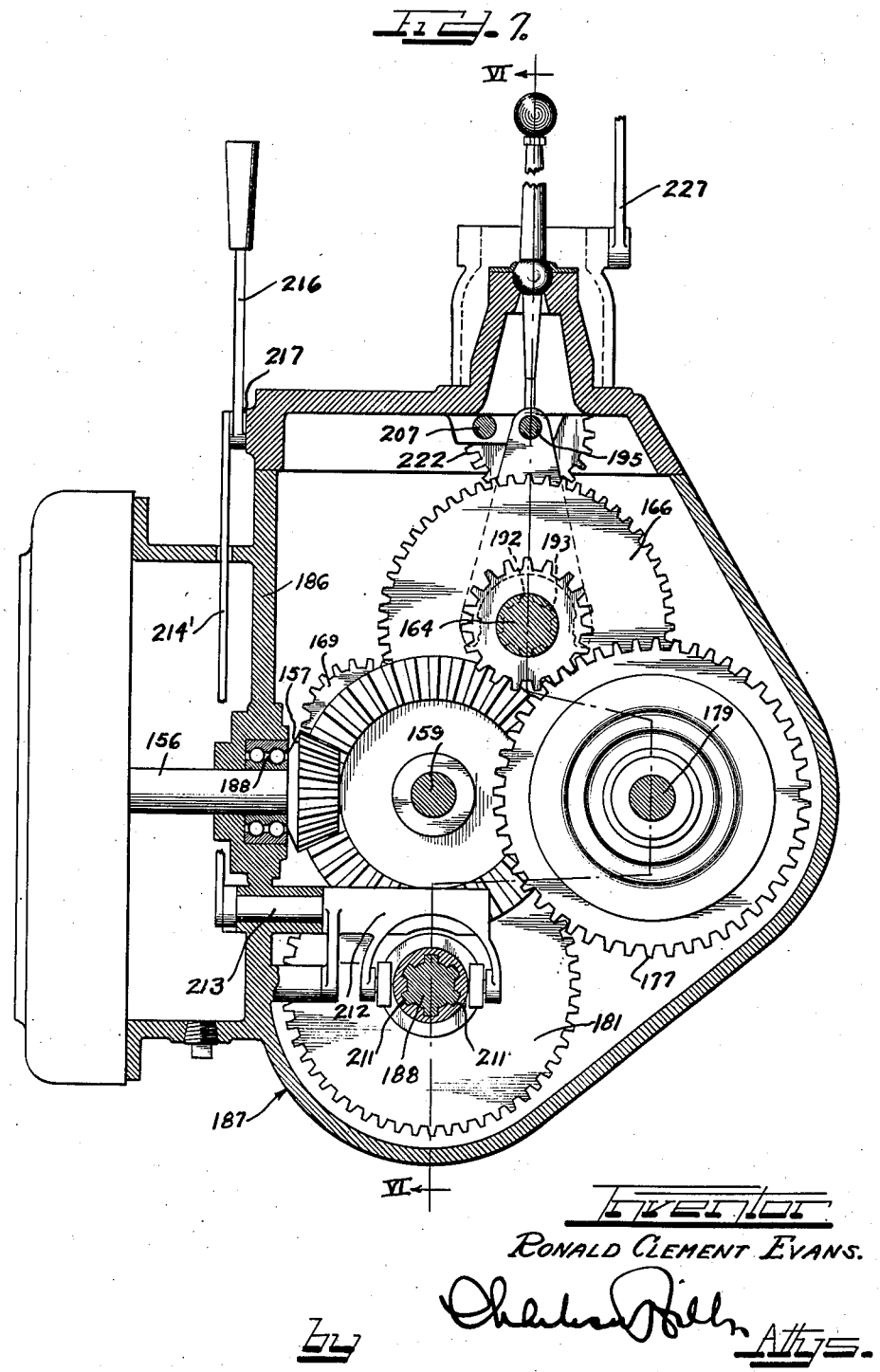

Patented Apr. 1, 1941

2,236,814

UNITED STATES PATENT OFFICE 2,236,814

STREET SWEEPER AND DRIVING SYSTEM THEREFOR

Ronald Clement Evans, Elgin, Ill., assignor to Elgin Sweeper Company, Elgin, Ill., a corporation of Illinois Application May 12, 1938, Serial No. 207,444

2 Claims. (Cl. 15—80)

This invention relates to street sweeping apparatus and to the driving system thereof.

Many forms of street sweeping apparatus have been employed in the past for sweeping streets and other surfaces to be swept. The different forms of sweeping apparatus may be roughly classified as caterpillar brush sweepers, rotary brush sweepers, and combined rotary brush and conveyor sweepers. Caterpillar brush sweepers have not met with the same degree of success as have the other two types of sweepers. There may be many explanations for this, but the principal one appears to lie in the fact that an efficient caterpillar brush and brush assembly together with satisfactory driving means and power system has not as yet been designed which could be manufactured at a reasonable cost and be rugged and reliable in use.

It is an object of the present invention to provide a novel street sweeper and driving system therefor which is economical to manufacture, which is rugged and reliable in use, and which is extremely efficient in operation.

Another object of this invention is to provide a novel driving system for both the vehicle and the movable sweeping elements thereof, a common prime mover being provided for the entire system.

A further object of this invention is to provide a novel power transmission device and a novel method of operating same in a sweeper.

Another and further object of this invention is to provide a novel transmission system having two separate and independent power take-offs from a single driving means.

Another and still further object of this invention is to provide a novel street sweeping apparatus having the elements thereof associated together in a novel manner.

Still another object of this invention is to provide a novel street sweeping apparatus, the essential component parts of which are assembled together in a minimum amount of space for maximum efficiency.

A still further object of this invention is to provide a novel street sweeping apparatus, the essential component parts of which are assembled on the vehicle for carrying the sweeping apparatus in such a manner as to distribute the weight thereof in a more effective manner than has hitherto been possible.

The novel features which I believe to be characteristic of my invention are set forth and described with particularity in the appended claims. My invention, however, both as to its organization, construction, and method of operation, together with further objects and advantages thereof, may best be understood by reference to the following description taken in connection with the accompanying drawings, in which:

Figure 1 is a side elevational view of a street sweeping apparatus embodying the principles and teachings of the present invention;

Figure 2 is a plan view of the sweeping apparatus of Figure 1 with part of the apparatus broken away to show the transmission and steering mechanism;

Figure 3 is a rear elevational view of the sweeping apparatus of Figure 1 with a portion of the apparatus removed to show the power take-off from the transmission;

Figure 4 is an enlarged fragmentary sectional view taken along the line IV—IV of Figure 2 for the purpose of showing the caterpillar brush assembly, the debris storage hopper, and the transmission;

Figure 5 is a diagrammatic view of the dual transmission system;

Figure 6 is an elevational view partly in cross-section of the transmission taken along the line VI—VI of Figure 7;

Figure 7 is a side elevational view partly in cross-section of the transmission taken along the line VII—VII of Figure 6; and Figure 8 is an elevational view of the dual wheel assembly which supports the rear of the vehicle on which the sweeping apparatus is mounted.

Referring now to Figures 1 to 4 of the drawings, the sweeping apparatus illustrated therein is a street sweeper of the caterpillar brush type. The sweeping elements of this apparatus, together with their associated elements are mounted on a motor driven vehicle 10, the principal component parts of the complete apparatus being the caterpillar brush assembly 11, side brooms 12, a dirt and debris storage hopper 13, and a chassis 14, having a rear mounted motor 15 mounted thereon. The chassis 14 includes a pair of front wheels 16 which are the driving wheels of the vehicle and which are mounted on a fixed axle 17; and a pair of rear wheels 18 which are preferably mounted closely together on a pivotally mounted steering assembly 19 (the details of which are shown in Figure 8 of the drawings). Steering assembly 19 is connected through a suitable steering mechanism 20 to a steering wheel 21 disposed in a driver's compartment or cab 22.

To enhance the general appearance of the vehicle 10 and to protect the greater part of the sweeping apparatus from the elements, a body 23 is provided which forms a continuation of cab 22 and which may be given any shape which will further enhance the general appearance of the vehicle. In the upper forward wall of the body 23, a relatively large transverse opening is provided to permit access to the upper portion of the caterpillar brush assembly 11. This transverse opening in the upper forward wall of body 23 is closed by a sliding cover 24 which is held in desired position by a pair of flange members 25 welded or otherwise suitably secured to the top of body 23, the flanges 25 being so arranged as to permit transverse sliding movement of the cover 24.

The dirt and debris collecting hopper 13 is situated at the extreme forward end of the vehicle 10 and communicates directly with the upper portion of the brush assembly 11. Hopper 13 is designed to receive dirt and debris carried upwardly thereto by the sweeping apparatus and to store the same until it is desired to empty the hopper 13. Lower end wall 26 of the dirt and debris collecting hopper 13 is pivotally mounted to the end of chassis 14 by a pair of hook shaped arms 27 which are pivotally secured to the horizontal frame members of the chassis 14, as at 28.

In order to hold the end wall 26 of hopper 13 in its closed position so as to prevent escape of dirt and debris from the hopper, a flexible cable or chain 29 is employed to hold end wall 26 in place. Chain 29 is connected at one end to the end wall 26, is then passed over a sheave 30 secured to the side wall of the body at 23, and is connected finally at its opposite end to a dump lever 31. The dump lever 31 is pivotally mounted on the body 23 as at 32, its downward angular movement being limited by a suitable stop block 33 to the position shown in Figure 1. In this position the lever is in an over-center position which automatically locks the end wall 26 in its closed position. When dump lever 31 is moved upwardly and forwardly, the forward movement of the flexible cable or chain 29 permits the end wall 26 to open by virtue of its own weight.

The caterpillar brush assembly 11 includes in general a caterpillar brush 34, and a caterpillar brush housing 35, comprising an upper stationary housing portion 36 and a lower movable housing portion 37 arranged for limited angular movement about a transverse axis. More specifically, lower housing portion 37 is hinged to and supported by upper housing portion 36, as at 38. The rear wall 39 of the housing portion 37 is preferably given a segmental cylindrical curvature, and the lower end 40 of the top wall of upper housing portion 36 is similarly curved but arranged to permit the lower housing member 37 to be telescoped thereover. The side walls of lower housing portion 37 overlap the side walls of upper housing portion 36, even when the former are in their lowermost position. This substantially complete telescopic engagement of the lower housing member 37 with the upper housing member 36 permits the former to be raised and lowered without any substantial interference from the latter.

In order to permit ready access to the caterpillar brush 34 to repair or replace a portion thereof, in a manner which will presently be explained, the rear wall 39 includes a pivotally mounted panel 41 which preferably extends over a major portion of the rear wall 39.

The caterpillar brush assembly also includes a pair of dirt shoes 42 carried on the lower housing portion 37 by arms 43, the latter being pivotally connected to the shoes 42 as well as to the housing portion 37. Dirt shoes 42 are in the form of runners which ride along the street surface, the forward and rear ends 44 and 45 being turned up for that purpose. These shoes prevent dirt and other debris from being thrown out of the side of the sweeping apparatus. A stop block 46 around each side of the housing portion 37 engages the arms 43 when the housing portion 37 is raised, and this carries the shoes 42 up with it.

In order to provide continuous and efficient sweeping irrespective of ripples and the like in the street surface, a floating mount 47 is provided for caterpillar brush 34. This floating mount has the effect of permitting the lower end of the caterpillar brush 34 to float on the surface being swept. More specifically, the caterpillar brush floating mount 47 comprises a pair of tracks 48 and 49 which are mounted in parallel spaced relationship upon both sides of the lower housing portion 37. The tracks 48 and 49 may be provided by employing off-set flange members which are welded or otherwise suitably secured to the sides of housing portion 37. Portions of the housing wall between the complementary track members 48 and 49 are cut away as at 50 and 51 to permit free movement of the caterpillar brush supporting means which extends therethrough. A caterpillar brush supporting plate 52, having small wheels or rollers 53 and 54 is disposed between each pair of complementary tracks 48 and 49, the wheels or rollers 53 and 54 being arranged to ride in tracks 48 and 49 respectively. It will thus be understood that the caterpillar brush supporting plate 52 is mounted for limited movement along a line parallel to the tracks 48 and 49.

Secured to the lower portion of the supporting plate 52 are two bearings 55 and 56 which are adapted to receive and have journalled therein sprocket axles 57 and 58. Sprocket axles 57 and 58 each carry a pair of sprocket wheels 59 (see Figure 4), over which two endless articulated caterpillar brush chains 60 ride. At the upper end of the assembly, the two endless chains 60 ride on sprocket wheels 61, which are similar to the sprocket wheels 59 and which are carried on a sprocket axle 62. Since the position of the lower ends of the caterpillar brush 34 is defined by the position of the axles 57 and 58, it will readily be perceived that the position of the lower end of the caterpillar brush 34 depends upon the relative position of the brush supporting plate 52 in the complementary tracks 48 and 49.

Due to the relatively heavy weight of caterpillar brush 34, some means must be provided to partially relieve the weight of the brush and brush mechanism from the brush fibres. Such a means may be conveniently provided by counterbalancing the brush supporting plate 52. One means for providing such a counterbalance is shown in Figure 1, wherein counterweights 63 are provided on opposite sides of vehicle 10 and are pivotally supported from the chassis 14 by means of counterweight arms 64, the counterweight arms being pivotally mounted on supporting brackets 65 at an intermediate point in length, as at 66. The counterweight arms 64 each have an overhanging portion 67 which pivotally carries the supporting link arm 68. The lower end of the link arm 68 is bolted or otherwise suitably secured to the supporting plate 52 as at 69. As is clearly shown in Figure 1 of the drawings, the lower end of each link arm is preferably provided with a series of holes so that the relative lengths of each link arm may be adjusted at the will of the operator of the machine. A position index may be provided by employing an index scale 70 and a pointer 71 on the plate 52.

From the above description, it will be apparent that the greater part of the weight of the caterpillar brush 34 is released from the brush fibres. The counterweights 63 are preferably adjusted on their arms 64 until the force tending to lift the caterpillar brush off of the street approaches but does not quite equal the weight which the brush fibres of the brush 34 must support. In practice, it will be found that the position of the counterweights 63 should be adjusted depending upon the type and nature of the debris which is being swept. Thus, in the spring of the year, when there is a large amount of debris on the streets, the counterweight 57 will be adjusted so that a greater force is bearing down on the brush fibres than in the summer, when dust is the principal type of debris being swept up. This floating mount and counterbalancing arrangement thus provides an extremely flexible arrangement for the sweeping apparatus, since it permits ready and convenient adjustment of the apparatus depending upon the nature of the debris which is being swept. This tends to greatly prolong the average life of the brush fibres.

Previous mention has been made of the fact that the lower housing portion 37 is pivotally mounted for limited angular movement on upper housing portion 36. Some means must, of course, be provided for limiting downward movement of the housing 37, and for raising and lowering the same at the will of the operator. The means for raising housing member 37 must include means for raising caterpillar brush 29 at the same time. Accordingly, a flexible cable or chain 72 is provided for defining the lowermost position of the housing 37, the chain 72 being connected at one end to the housing 37, as at 73, and at the other end to the chassis 14, as at 74.

Additional means is provided for raising and lowering the entire caterpillar brush assembly 11. More particularly, the caterpillar brush 34 and the caterpillar brush lower housing portion 37 may be raised or lowered by means of a flexible chain 75, which branches off into two lower chain portions 76 and 77, which are connected to the caterpillar brush housing 37 and the caterpillar brush supporting plate respectively. The upper end of chain 75 is connected to a crank arm 78 of a control lever 79, which is pivotally mounted on the chassis 14, as at 80. Control lever 79 is preferably equipped with the usual spring biased latch (not shown) under the control of control lever latch release 81, the latch being arranged to engage a cooperating notched latch plate 82 mounted on the side of the vehicle. As shown in Figure 1 of the drawings, when control lever 79 is in its forward position, the caterpillar brush assembly 11 is in its lowermost position, while when control lever 79 is in its rearwardmost position, the caterpillar brush 34 and the caterpillar brush housing 37 have been lifted by the chain 75 to a raised position.

A caterpillar brush tensioning device 83 is provided to take up slack in the endless articulated chains 60 of the caterpillar brush assembly 11 and to provide the desired amount of tension therein. As will readily be appreciated from a cursory examination of Figure 4, the degree of tension in the endless chain 60 can be governed by varying the relative spacing of the upper sprocket axle 62 from the two lower sprocket axles 57 and 58. Thus, if some means is provided for varying the distance between the upper sprocket axle 62 and the two lower sprocket axles 57 and 58, it is apparent that an adjustable tensioning arrangement will be provided.

More specifically, tensioning device 83 is provided by journalling the upper sprocket axle 62 in suitable bearings 84 carried on support plate 85, which are arranged to slide within complementary track members 86 and 87. These complementary track members 86 and 87 are secured to the side walls of upper housing 36 in parallel spaced relation to each other, but special note should be taken of the fact that the longitudinal axis of track members 86 and 87 are not in parallelism with the longitudinal axis of track members 48 and 49. While the angle of divergence of the longitudinal axis of the two separate tracks may vary within wide limits without departing from the spirit and scope of the present invention, the angle is illustrated in Figure 1 of the drawings as being approximately 20°, the lower ends of the track members being further apart from each other than their upper ends. Due to the fact that the longitudinal axis of the track members 86 and 87 is disposed at an angle with respect to the longitudinal axis of track members 48 and 49, it will readily be appreciated that by raising and lowering these support plates 85, the tension in the endless chain 60 may be adjusted. This is by virtue of the fact that as the plate members 85 are lowered in their track members 86 and 87, the distance between the upper sprocket axle 62 and the two lower sprocket axles 57 and 58 is increased. The position of the support plate 85 in the tracks 86 and 87 is determined by clamping bolts 88 which are mounted in collars 89 to the upper housing portion 36. A position index is preferably employed by providing an index scale 90 on the sides of the housing opposite each lower track 86 and by providing a pointer 91 on the movable plate 85 of each tensioning device 84. A suitable longitudinal slot 92 is, of course, provided inside of upper housing portion 36 to permit unrestricted movement of the sprocket axle 62 when the plate 85 is raised or lowered in the tracks 86 and 87.

As may be seen best in Figure 4 of the drawings, the caterpillar brush 34 is preferably made up of a plurality of individual brush units 93 which are detachably and individually secured to the articulated chains 60. Each brush unit 93 includes in general a brush head 94 and a brush proper or fibre portion 95, which is made up of a multitude of individual brush fibres composed of any suitable material, such for example, as bamboo fibres.

The novel features and specific characteristics of this caterpillar brush and mounting including the floating mounting and the chain tensioning device together with other features of the caterpillar brush assembly are described in detail in my copending applications, Serial No. 207,446, filed May 12, 1938, and Serial No. 216,740, filed June 30, 1938, and assigned to the same assignee as the present invention.

During the sweeping operation, the caterpillar brush 34 is driven in a counterclockwise direction from the upper sprocket axle 62. Individual brush units 93 as they pass over the surface being swept cause the dirt and debris to be thrown forwardly and upwardly. In order to convey the dirt and debris upwardly to a point where it may be deposited in the hopper 13, an inclined plane 96 must be provided immediately below the ends of brush fibres 95. This inclined plane 96 forms the bottom wall of the brush housing portions 36 and 37, although it is spaced from the lower edges of the side walls of housing portions 36 and 37.

In order to get the dirt and debris onto this inclined plane 96, it is necessary to cause the lower end 97 of the inclined plane 96 to diverge slightly away from the brush fibres 95 to provide a throat into which the dirt and debris may be thrown by the brush. The upper portion 98 of the inclined plane, however, is preferably in direct contact with the lower ends of the brush fibres 95.

Extending downwardly from the lower edge of the inclined plane 96 and forming substantially a continuation thereof is a drag plate 99. For a reason which will presently appear, drag plate 99 is mounted for limited longitudinal movement in a plane parallel to the lower end portion 97 of the inclined plane 96. The particular mounting for the drag plate 99 includes a carriage 100 having a pair of cross arms 101 and a pair of end bars 102. Rotatably mounted on each end bar 102 is a pair of flanged wheels 103. Housing 37 is suitably slotted at 104 for the reception of wheels 103, the major axis of the slots 104 being parallel to portion 97 of inclined plane 96. Welded or otherwise suitably secured to the side walls of housing 37 within slots 104 are a set of tracks 105 in which the wheels 103 are arranged to ride. Two drag plate mounting arms 106 are secured to the underside of the drag plate 99 in any convenient manner, such as by riveting or the like, and these mounting arms are pivotally mounted to the carriage as at 107. A stop arm 108, which is arranged to engage the lower cross bar 101, is provided to prevent angular movement of the drag plate 99 below the plane of the portion 97 of the inclined plane 96. That is to say, when the carriage 100 is in its lowermost position, the drag plate 99 may be moved angularly upwardly, but cannot move angularly downwardly.

Now it has been found that in sweeping with a caterpillar brush, two separate and distinct problems must be overcome in order to have a satisfactory and efficient sweeping apparatus. More particularly it has been found that in order to sweep and gather finely divided debris, the drag plate 99 must be disposed relatively close to the surface being swept. When this is not done, there is hardly any effective pick-up by the caterpillar brush of the sweeping apparatus, for the reason that the dirt is swept forwardly underneath the drag plate. By way of example, it has been found that when the drag plate was disposed with its lower edge approximately two inches above the surface being swept, there was little or no pick-up ability left in the sweeping apparatus; but when the drag plate was disposed with its lower edge approximately ¾ of an inch above the surface being swept, the apparatus was very efficient in sweeping dirt.

If a drag plate is fixed in this position, however, it has been found that the sweeping apparatus would not operate effectively to sweep up leaves and other debris of that character for the reason that the leaves would not pass under the lower edge of the drag plate, but would cause them to be pushed forwardly in front of it. Some means is necessary, therefore, to permit the leaves to pass to the caterpillar brush. To accomplish this end, the drag plate 99 is periodically oscillated (that is, raised and lowered) to permit the leaves and other similar debris to pass thereunder to the caterpillar brush 34. In order to maintain effective and efficient sweeping of dirt and other finely divided debris, it has been found preferable to provide a mechanism which will maintain the drag plate 99 in its lowermost position for a predetermined distance and to then effect a quick lifting and lowering of the drag plate 99.

The means for periodically raising and lowering the drag plate 99 includes a cam 109 of the wiper or involute type which is centrally secured to a cam axle 110 and that is journalled in suitable bearings (not shown) secured to one side wall of the housing 37 and to a centrally disposed mounting bracket 111 which is riveted or otherwise suitably secured to the lower wall of hopper 13. Secured to the outer end of the cam axle 110 is a sprocket wheel 112 which is driven by an articulated chain 113 in a manner presently to be described. At this time it is sufficient to state that the cam 109 is preferably arranged to make one revolution for approximately twelve to thirteen feet of travel by the sweeping apparatus.

The cam 109 is positioned to engage a roller bar or cam follower 114 which is carried at the lower end of an L-shaped roller bar support arm 115. Roller bar support arm 115 is separately secured to the carrier 100, as may be seen best in Figure 4 of the drawings. From a careful consideration of the drawings, it will be understood that the cam 109 will cause an upward movement of the carrier 100 along its tracks 105 during a small fraction of each revolution of the cam axle 110. This upward movement of the carrier 100 causes the drag plate 99 to be periodically raised in a plane parallel to the lower portion 97 of the inclined plane 96.

In order that the drag plate 99 will not be damaged or injured when it strikes large boulders or stones, the drag plate 99 is pivotally mounted on the carrier 100, as previously described, so as to be movable about a transverse axis defined by the pivot point 107.

The above described novel method and means for picking up debris of various classes such as dirt, leaves, twigs, etc., is described and claimed in my copending applications Serial No. 207,443, filed May 12, 1938, and Serial No. 207,445, filed May 12, 1938, each of which are assigned to the same assignee as the present invention.

To supplement the action of the caterpillar brush 34, twin side brooms 12 are provided. Brooms 12 are of the so-called "digger" type, and are arranged for rotation in a plane at a slight angle to the horizontal, as may be seen best in Figure 3 of the drawings. The broom 12 which is located on the right side of the machine is, of course, arranged for rotation in a clockwise direction as viewed in Figure 2 of the drawing, while the broom 12 on the left side of the sweeping apparatus is arranged for rotation in a counterclockwise direction. The broom on the curb side digs the dirt from the gutter during the sweeping operation and throws it under the caterpillar brush, while the broom on the other side assures a neat feather edge to the path swept. It will thus be apparent to those skilled in the art that the two side brooms 12 clean a wide sweeping path in combination with the main caterpillar brush 34, yet at the same time keep the overall width of the machine narrow to accommodate modern traffic conditions.

More specifically, each broom 12 comprises a brush head 116 in which a multitude of brush fibres 117 are mounted. The brush fibres 17 may be made up of any suitable material but preferably are made up of steel wire.

The manner in which the side brooms 12 are assembled and mounted on the sweeping apparatus will now be described. The side broom assembly as a whole is suspended from the side broom driver gear housing 118 which is supported by the arms 119 from the chassis 14 of the vehicle. Secured to the under side of the drive gear housing 118 is a ball housing and cap assembly 120 including a two part upper housing 121 and 122 and a lower ball housing 123. Secured to or forming a part of the lower ball housing 123 is a cylindrical housing member 124. Depending from the under side of housing 124 and secured to the top of the broom head 116 is a collapsible and expansible shaft protector sheath 125 which is preferably in the form of a bellows. Enclosed within the ball housing and cap assembly 120, the tubular housing member 124 and the expansible and collapsible shaft protector sheath 125 is a drive shaft (not shown) which transmits rotary motion from the drive gear assembly within drive gear housing 118 to the broom head 116. The necessary bearing support, lubricating and packing means, and clutch mechanism are included within the above housing elements, but have not been specifically illustrated since they form no part of the present invention.

In connection with the side broom mounting, it should be understood that the side broom drive shaft and associated elements are arranged so that the side brooms may be lifted directly upwardly or may be rocked rearwardly and upwardly if they engage a large object which cannot be swept as will hereinafter be described.

In Figure 1 of the drawings, one form of means is shown for lifting the side broom 12 directly upwardly off of the surface being swept. This means includes in general a lift yoke 126 which is pivotally connected to the broom head at 127. Extending rearwardly from the yoke 126 is a lift yoke supporting arm 128 which freely rides in a lift yoke slide 129. The lift yoke slide 129 is supported in a universal mounting or ball and socket assembly 130 which in turn is supported from a yoke anchor bracket 131 secured to one of the main longitudinal members of the chassis 14. Extending between the lift yoke slide 129 and the lift yoke 126 is a helical compression spring 132 which surrounds the lift yoke supporting arm 128. This lift yoke spring 132 normally biases the broom 12 to the position shown in Figure 1 of the drawings. If the broom 12 hits some heavy object, such as a boulder or the like, during the forward motion of the sweeping apparatus, the lift broom assembly is pivoted rearwardly and upwardly from its universal mounting within the ball housing and cap assembly 120 against the action of the compression spring 132. As soon as the object has been passed over, the compression spring 132 returns the broom 12 to its normal position. A side broom stop bracket 133 having adjustable stop fingers 134 in the form of bolts, limits the outward movement of the broom assembly. Additional biasing springs (not shown) may, of course, be provided if desired.

The side broom 12 may be lifted directly upwardly off of the street by means of a control lift rod 135 which is hooked or otherwise pivotally secured to a bracket 136 secured to the top of the lift yoke 126. The upper end of the control lift rod 135 extends freely through an apertured collar of a crank arm 137 and is provided with a threaded upper end 138 over which a spring 139 is disposed which in turn is held in place by a nut 140 screwed on to the threaded end 138 of the control lift rod 135. The crank arm 137 is moved through a suitable link mechanism 141 by the control lever 142. Control lever 142 is pivotally mounted to the chassis 14 as at 143, and is associated with a control lever latch plate (not shown) in the usual manner, a control lever latch 145 being provided to hold the control lever in one of several predetermined desired positions.

As will readily be understood by those skilled in the art, when the control lever 142 is in the position shown in Figure 1 of the drawings, the broom 12 is in its lowermost position, and when the control lever 142 has been pulled back by the operator, or to a position to the left of that shown in Figure 1, the broom 12 will be lifted substantially vertically off of the street by the control lift rod 135.

Since all sweeping apparatus tends to raise a slight cloud of dust, the sweeping apparatus hereinbefore described is preferably provided with means for laying down a dust penetrating spray of water which includes a water storage tank 146 and a plurality of nozzles 147 carried on a water distributing rod 148 which is supplied with water from the storage tank 146 by a suitable supply pipe 149. A large hose 150 is connected to the water supply tank 146 is carried along the side of the sweeping apparatus in any convenient place, such as that shown in Figure 1, so that it may readily be coupled to the usual water hydrant (not shown) to fill the water tank 146 when desired. A water gauge 151 having valves 152 and 153 at the top and bottom respectively of the gauge is mounted on one side of the sweeping apparatus within full view of the operator of the machine to provide a visual indication of the water level in the water supply tank 146.

As will readily be appreciated by those skilled in the art, it is essential in a spraying system for street sweeping apparatus that sufficient pressure be maintained on the spray line at all times to give ample volume and forceful penetration of water into the sweepings, under all conditions of light or heavy sweeping, whether the machine is in motion or stationary. To this end, the water supply tank 146 is maintained under pressure by compressed air supplied to the water supply tank 146 through the compressed air line 154. The pressure in the compressed air line 154 is maintained by a suitable air compressor 155 (see Figures 2 and 4) which is driven directly from the main transmission unit of the machine, presently to be described.

One of the important and novel features of the present invention is the novel means for supplying power to all parts of the sweeping apparatus from a single prime mover through a single multi-function transmission unit. The novel transmission unit itself will first be described and then the manner in which power is transmitted from the transmission unit to the various moving elements of the apparatus will be described.

In Figure 5 of the drawings, a schematic illustration of the transmission unit has been shown. Power from the motor 15 (Figure 1) is transmitted to the transmission unit through a drive shaft 156. Secured to the end of the drive shaft 156 is a pinion gear 157 which is arranged to mesh with and drive a ring gear 158, which is secured to the main shaft 159 of the transmission unit. Secured to main shaft 159 is a main shaft reverse gear 160, a main shaft first speed gear 161, a main shaft second speed gear 162, and a main shaft third speed gear 163. Gears 160, 161, 162 and 163 are secured in such a manner as to prevent relative rotation between the gears and the main shaft 159, such as by means of suitable slot and key connection (not shown). Rotatably mounted on a countershaft 164 is a countershaft reverse gear 165, a countershaft first speed gear 166, a countershaft second speed gear 167, and a countershaft third speed gear 168. Gears 166, 167 and 168 are constantly meshed with gears 161, 162 and 163 respectively. Reverse gear 165 is constantly meshed with a reverse idler gear 169 which is rotatably mounted on a reverse gear idler shaft 170. The reverse idler gear 169 is also constantly in mesh with reverse gear 160 on main shaft 159.

Slidably mounted on countershaft 164 are four clutches 171, 172, 173, and 174 which are arranged to be selectively interlocked with cooperating clutch plates 175 secured to each of gears 165, 166, 167 and 168. While the clutches 171, 172, 173 and 174 are slidably mounted on counter shaft 164, it is to be understood that they are arranged and mounted on the countershaft 164 in such a manner that no relative rotation can occur between the clutches and the countershaft 164. This may be arranged in any suitable manner, such as by a slot and key connection (not shown in detail) or in any other manner well known to those skilled in the art.

From the above description it will readily be understood that when one of the clutches 171 to 174 inclusive is moved into locking engagement with one of the cooperating clutch plates 175, that the countershaft 164 is rotated by the gear which has been locked to the shaft and at a speed depending upon the gear ratio of that gear and its complementary gear on the main shaft 159.

Secured to countershaft 164 and arranged to constantly rotate therewith is a drive gear 176. This drive gear 176 is meshed with a driven gear 177 of a differential gear box 178. The detailed construction of the differential 178 and the particular gear arrangement therein has not been illustrated, since it forms no part of the present invention, but it is to be understood that this differential 178 is of a conventional design, well known to those skilled in the art, power being transmitted through the differential 178 from the driven gear 177 to a pair of contiguous shafts 179.

The transmission unit illustrated in Figure 5 of the drawings also includes a second countershaft 180 upon which is rotatably mounted two countershaft gears 181 and 182, which are constantly in mesh with main shaft first speed gear 161 and main shaft second speed gear 162 respectively. Selectively operated clutches 183 and 184 are slidably mounted on countershaft 180, but arranged so that no relative rotation occurs between the clutches 183 and 184 and the countershaft 180. These clutches 183 and 184 are arranged to interlock with cooperating clutch plates 185 secured to each of the gears 181 and 182. It will thus be understood that when clutch 183 is interlocked with the cooperating clutch plate 185 on gear 181, that the countershaft 180 is interlocked with gear 181 and hence rotated by the gear 181 at a speed dependent upon the gear ratio between the main shaft gear 161 and the countershaft gear 181. Similarly, when clutch 184 is interlocked with gear 182, the countershaft 180 is rotated at a speed dependent upon the gear ratio between main shaft gear 162 and countershaft gear 182.

From the description given above it will readily be apparent that by means of a single drive shaft from a single prime mover two different power take offs at different speeds may be obtained through the provision of only a single main shaft but of two countershafts. As will presently be explained in detail, the countershaft 164 is arranged to drive the vehicle 10 at any one of three forward speeds or in reverse and the countershaft 180 is arranged to drive all of the sweeping apparatus, including the main caterpillar brush and the rotary side broom. It will at once be apparent that the movable sweeping elements may be driven at a speed entirely independent of the speed or direction of motion of the vehicle upon which the sweeping apparatus is mounted. As will at once be apparent to those skilled in the art, this is an extremely important and advantageous feature, particularly in view of the fact that this independent operation of the movable sweeping elements is obtainable through a single transmission unit.

In Figures 6 and 7 of the drawings, I have illustrated the essential details of the transmission unit which has been schematically illustrated in Figure 5 of the drawings. Referring to Figures 6 and 7, the drive shaft 156 extends through the end wall 186 of a transmission housing member 187, the shaft 156 being journalled in a suitable anti-friction bearing member 188 in the usual manner. The countershaft 164 which carries countershaft reverse gear 165 and countershaft forward gears 166, 167 and 168 is mounted in anti-friction bearing members 188' and 189 carried in reinforced portions 190 and 191 of transmission housing 187. The main shaft 159 is journalled in suitable anti-friction bearing devices (not shown) similar to the bearing members 188' and 189 supported in the side walls of the housing 187. The idler shaft 170 which carries reverse idling gear 169 is supported in any suitable manner (not shown) to one of the side walls of the housing 187. Clutches 171 and 172 are mounted as a pair between countershaft gears 165 and 166. Clutches 171 and 172 are centrally apertured and slotted as at 192 for mounting on the countershaft 164 over the keys 193, the keys 193 preferably being formed integral with shaft 164. A gear shifting yoke 194 extends in spaced relationship over the shaft 164 and into engagement with the clutches 171 and 172. The yoke 194 is carried on a supporting rod 195 which is arranged to be moved transversely of the apparatus by a gear shift lever 196. The gear shift lever 196 is supported in a universal mounting 197 having a cover plate thereon, the usual H plate (not shown) being employed over the top of the universal mounting 197 to confine the movement of the gear shift lever 196 in the conventional manner. It is to be understood, however, that the top and bottom of the H extend transversely of the machine rather than lengthwise of the machine, as is the usual practice on passenger vehicles of the present day. The lower end 199 of the gear shift lever 196, is arranged to engage a yoke member 200 secured to the supporting shaft 195 when the gear shift lever 196 is being moved along one leg of the H. The support shaft 195 is preferably notched at three places, 201, 202, and 203, to define first speed position, neutral, and reverse position. A spring-pressed ball 204 under the action of a compression spring 205 is arranged to engage the notches 201, 202, and 203.

Clutches 173 and 174 are mounted in a similar manner on countershaft 164 between gears 167 and 168. The clutches 173 and 174 are arranged for axial movement under control of a yoke 206 carried on a second yoke support shaft 207. The yoke support shaft 207 has mounted thereon a gear shift lever engaging yoke (not shown) which is similar to yoke 200 on support shaft 195. The yoke support shaft 207 is mounted in a similar manner to yoke support shaft 195 and is arranged to be engaged and moved by the gear shift lever 196 when the gear shift lever is moved along the other side of the "H" from that which effects movement of the shaft 195.

The auxiliary or lower countershaft 180 is supported in anti-friction bearing members 207 and 208 carried in bearing support bosses 209 and 210 respectively, formed as part of the side walls of the housing 187. The clutches 183 and 184 which are arranged to selectively lock the countershaft gear wheels 181 and 182 to the countershaft 180, are mounted together on a keyed portion 211 of the shaft 180. The clutches 183 and 184 are secured to a yoke 212 which is rigidly secured to a short shaft 213 carried in the end wall 186 of the housing 187. Secured to the opposite end of the shaft 213 is a crank arm 214 which is in turn connected through an intermediate link arm 214' to an upper crank arm 215 which is rigidly secured to a gear shift lever 216 and is pivotally mounted on housing 187 as at 217. Gear shift lever 216 is a three position gear shift, or in other words is arranged to have a neutral position and a high and low speed position. As viewed in Figure 6 of the drawings, the gear shift lever 216 shown therein is in its neutral position. When the gear shift lever 216 is moved to the left in Figure 6, the crank arm 215 is moved in a counterclockwise direction which causes a corresponding counterclockwise movement of the lower crank arm 214 to throw the clutch 183 into locking engagement with the cooperating clutch locking plate 185 of the gear 181. When the gear shift lever 216 is moved to the right, as viewed in Figure 6, the crank arm 215 is moved in a clockwise direction, thus causing a similar clockwise movement of the crank arm 214 to move the clutch 184 into locking engagement with the cooperating clutch plate 185 of gear 182. The crank arms 214 and 215 provide the necessary offset for the intermediate link arm 214' in order to permit it to extend past the main drive shaft 156 from the engine 15.

The driven shafts 179, which extend from the differential 178, are supported in suitable anti-friction bearing members 218 and 219 carried within bosses 220 and 221 respectively.

From the above description of my novel transmission, it will be apparent that the transmission is, in general, of the so-called "selective clutch type" inasmuch as the necessary gear changes are carried out by shifting heavy duty clutches rather than by shifting the gears themselves. This permits the gears to constantly remain in mesh and substantially eliminates any possibility of stripping the gear teeth. Whenever the drive shaft 156 rotates, all of the gears in the transmission unit rotate, but it is only possible for one gear at a time to be connected to any one countershaft to cause rotation of the latter, although it is specifically designed to have both countershafts selectively rotated at different speeds at the same time, or have one countershaft rotated while the other remains idle.

In the upper right hand section of Figure 6, a power take-off for the compressor unit 155 is shown. More specifically, a gear 222 mounted on a short stud shaft 223 carried on the side wall of the housing 187 is arranged to constantly be in mesh with the countershaft reverse gear 165. A second compressor shaft power take-off gear 224 is rotatably mounted on the compressor drive shaft 225 and is maintained constantly in mesh with the intermediate gear 222. A clutch 226, slidably mounted on the compressor drive shaft 225, but arranged thereon in such a manner that no relative rotation can occur therebetween, is arranged to be locked to the gear 224 in the same manner as the other clutch elements of the transmission unit are arranged, a gear shift lever 227 being provided to throw the clutch into and out of locking engagement with the gear 224.

The manner in which the transmission unit is connected to the various parts of the sweeping apparatus and drive wheels of the vehicle will now be described. Referring to Figures 1, 2, 3 and 5, the driven shaft 179 from the differential 178 extends outwardly to opposite sides of the vehicle 10 and terminates in bevel gear boxes 228. Extending at right angles from the beveled gear boxes 228 are drive shafts (not shown) enclosed within tubular housing members 229. Although the details of the beveled gear boxes 228 have not been shown in the drawings, it is to be understood that a beveled gear is secured to the driven shaft 179 and is meshed with a beveled gear secured to the drive shafts which are carried within the tubular housing 229.

At the opposite ends of the tubular housings 229 are a second set of beveled gear boxes 230, each containing a pair of beveled gears (not shown) one of which is secured to the end of the drive shaft within the tubular housing member 229 and the other of which is mounted on a short stud shaft 231. Mounted exteriorly of the beveled gear box 230 on shaft 231 is a sprocket wheel 232. A chain drive extends from the sprocket wheels 232 to the front driving wheel 16 of the vehicle 10 which includes a drive chain 233, the upper sprocket wheel 232 and a lower sprocket wheel (the details of which are not shown in the drawings) secured to the wheels 16.

Thus from the above description, it will be apparent that the vehicle 10 is provided with three forward speeds and one reverse speed from the motor 15 through the drive shaft 156, main shaft 159, the countershaft 164, the driven shaft 179, the pair of drive shafts disposed within the tubular housing 229 on opposite sides of the vehicle, the stud shafts 231 and the chain drive 233 to the front driving wheels 16 of the vehicle 10.

Power to the movable sweeping elements of the sweeping apparatus is taken from countershaft 180 which extends from the transmission unit to opposite sides of the vehicle. At the outer ends of the countershaft 180 are beveled gear boxes 234 which are similar to the beveled gear boxes 228. Extending at right angles from the bevel gear boxes 234 and extending forwardly therefrom along the side of the vehicle is a second set of drive shafts (not shown) which are enclosed within housing 235. It is to be understood that the drive shafts disposed within the housings 235 are coupled to the countershaft 180 through a pair of bevel gears in each of the bevel gear boxes 234. At the opposite ends of the drive shafts within the tubular housings 235 is a second set of bevel gear boxes 118, reference to which has already been made in the description of the side broom assembly. The specific details of the gear assembly within bevel gear boxes 118 forms no part of the present invention, and for that reason has not been illustrated in detail. It is to be understood however that in addition to the drive from the drive shaft to the side broom, there is also a drive to a stud shaft 236 which extends out of the gear housing 118 towards the main body of the vehicle 10. Mounted on the stud shaft 236 exterior of the housing 118 are two sprocket wheels 237 and 238. The sprocket wheel 237 carries a chain drive 239 which is coupled to a sprocket wheel 240 mounted on the upper caterpillar brush axle 62. The sprocket wheel 238 carries a chain drive 113 which is coupled to the sprocket wheel 112 which drives the cam 109 of the drag plate mechanism.

From the above description, it will be apparent that the drive shafts which are located within housings 235 directly drive the side broom 12 and in addition drive the main caterpillar brush 34 and the cam 109 of the drag plate mechanism. As has been previously pointed out, clutch means is provided within the housing 120 of the side broom assembly for disengaging the driving connection from the drive shafts within housing 235 when desired. This permits continual operation of the caterpillar brush 34 and the drag plate mechanism without necessitating simultaneous operation of the side brooms 12. Since the side brooms 12 are preferably lifted off of the street surface when not in use, the clutch mechanism for each side broom may be conveniently connected to the crank arm 137 through a connecting arm 241 (see Fig. 2). The connecting arm 241 for each side broom is so arranged that when the control lever 142 is pulled rearwardly towards the driver's seat, the clutch in the driving connection of each side broom is simultaneously disengaged at the same time that the side broom is lifted off of the street surface by the lift arm 135.

The dual wheel mount for the rear wheels 18 is shown in Figure 8. More particularly, the dual wheel mount comprises a spindle or king pin 242 which is journalled in a tapered housing 243 by suitable anti-friction bearing members 244 and 245. The lower end of the king pin 242 is swaged or otherwise provided with an enlarged end 246 at its lower end. Seated upon the swaged lower end 246 is an axle block 247 which is keyed to the king pin 242 as at 248. Extending outwardly from the axle block 247 are two short axles 249 and 250. The axles 249 and 250 preferably diverge slightly downwardly, as is clearly shown in Figure 8 of the drawings in order that the planes of the rear wheels 18 will not be vertical but will converge in the manner as shown in Figure 3 of the drawings.

The upper end of the tapered housing 243 is provided with an end plate 251 having an annular flange 252 thereon which extends into direct engagement with the upper anti-friction bearing member 245.

The upper end of the king pin or spindle 242 is threaded as at 253 for the reception of a lock nut 254 which prevents the king pin 242 from dropping out the bottom of the assembly. The lower connecting arm 20 of the steering mechanism is directly connected to the top of the king pin 242 in any suitable manner which will prevent any relative rotation between the king pin 242 and the link arm 20.

As will readily be apparent to those skilled in the art, the manner of operating the above described street sweeper is extremely simple. The prime mover or engine 15 which is preferably an internal combustion engine, is started and the vehicle 10 placed in motion by shifting the gear shift lever 196 into its first speed or low speed position. After the vehicle 10 has been placed into motion, the gear shift lever is successively thrown into its second speed position and then into its third or high-speed position, it being understood, however, that the third or high speed position is a relative term, for the sweeper is preferably not driven more than ten to fifteen miles per hour.

After the vehicle 10 has been placed in motion and the vehicle has arrived at the street or area to be swept, the control lever 79 is moved to its forward position, thereby lowering the caterpillar brush 34 and the lower caterpillar brush housing 37. The control lever 142 is also thrown to its forward position, thereby lowering the side brooms 12 and simultaneously causing the driving mechanism to the side brooms 12 to be connected to the drive shaft within the housing 235. Immediately before or immediately after the brushes are lowered to the street level, the gear shift lever 216 is thrown to one of its two operating positions, which position is selected will, of course, depend upon the nature of the debris which is to be swept. If the debris is principally dust, one speed is desirable, while if the debris is in the form of leaves, twigs, small branches and the like, a different speed will be selected.

If desired, the spraying equipment may be turned on to wet down the dust, this being provided by high pressure sprays from the nozzles or outlets 147 in the spraying pipe 148.

Due to the fact that the lower ends of the caterpillar brush assembly 34 is freely floating on the surface which is being swept, the lower ends of the brush fibres 95 are constantly in engagement with this surface. By properly adjusting the counterbalance weight 63, substantially all of the weight of the caterpillar brush assembly 34 is removed from the fibres 95 themselves. The individual brush units 93 sweep the dirt and other finely divided debris upwardly and forwardly against the drag plate 99 where it is carried by the brush 34 upwardly along the inclined plane 96 until it passes over the open mouth of the hopper 13.

Leaves and other debris of this character are pushed forwardly in front of the drag plate 99 by the drag plate itself until the drag plate is raised by the cam 109. At this time leaves and other debris of this character pass under the lower edge of the drag plate 99 where they are thereafter swept forwardly and upwardly by the brush units 93 onto the inclined plane 96.

As the rotation of the cam 109 is continued, the drag plate 99 is returned to its lowermost position where it is again effective to catch and collect the dirt swept forwardly and upwardly by the individual brush units 93. During the interval that the drag plate is being moved upwardly and returned, the dirt and finely divided debris on the surface being swept is merely thrown forwardly ahead of the brushes until such a time as the drag plate is in its lowermost position, when the dirt and other finely divided debris is again caught and collected by the drag plate and caused to pass upwardly along the inclined plane 96 into the hopper 13.

At the time the caterpillar brush 34 and the lower caterpillar brush housing 37 were lowered by the control lever 79, the dirt shoes 42 were also lowered until they freely floated on the street or surface being swept. In this position, the dirt shoes 42 slide along the surface being swept and prevent dirt and other debris from slipping out either side of the sweeping apparatus. These dirt shoes 42 thus prevent any impairment of efficient sweeping action by the apparatus.

After the storage hopper 13 has become filled, the dirt and debris collected therein may be dumped by throwing the dump lever 31 upwardly and forwardly, thus causing the lower end wall 26 of the hopper 13 to open about its pivot 28. After the hopper 13 has been dumped, the end wall 26 is returned to its closed position by pulling the dump lever 31 backwardly and downwardly until it has passed its overcenter position.

If it is desired to operate the sweeping apparatus without the use of the side brooms 12, the side broom control lever 142 is pulled to its rearwardmost position, thus raising the side brooms 12 off of the street and simultaneously disengaging the side broom clutch within the housing 120.

From the above description, it will be apparent that I have illustrated means which is extremely effective in sweeping streets and the like. The novel dual transmission mechanism eliminates the necessity for two separate transmissions and at the same time provides a very flexible system for transmitting power, since the speed of the caterpillar brush and other sweeping apparatus and associated mechanism is entirely independent of the speed of the vehicle. The distribution of power from the dual transmission unit provides an extremely compact assembly of elements and permits maximum sweeping efficiency with a minimum size sweeping apparatus. The particular location of the various sweeping elements and associated mechanisms provides an evenly distributed load on the vehicle chassis. The particular location of the caterpillar brush with respect to the rest of the equipment permits the location of the driver's cab at a place where all areas both to the front and to the rear of the sweeping apparatus may be seen at a glance.

While I have shown a particular embodiment of my invention, it will, of course, be understood that I do not wish to be limited thereto, since many modifications may be made, and I therefore contemplate by the appended claims to cover all such modifications as fall within the true spirit and scope of my invention.

I claim as my invention:

1. A street sweeper comprising a vehicle chassis supported on front and rear wheels, a motor mounted at the rear of said chassis and having a motor drive shaft extending forwardly therefrom, a dual drive transmission connected to said motor drive shaft and having separate sweeping equipment and vehicle drive shafts extending transversely of said chassis and having a gear reduction driving connection with said motor drive shaft, a caterpillar brush centrally mounted on said chassis, a debris storage hopper mounted at the forward end of said vehicle and arranged to have debris deposited therein by said caterpillar brush, a driving connection extending longitudinally along the outer side of said brush from said transmission sweeping equipment drive shafts to said caterpillar brush, and a driving connection extending longitudinally along the outer side of said brush from said transmission vehicle drive shafts to said front wheels.

2. A street sweeper comprising a vehicle chassis supported on front and rear wheels, a motor at the rear of said chassis and having a motor drive shaft extending forwardly therefrom, a dual drive transmission connected to said motor drive shaft and having separate sweeping equipment and vehicle drive shafts extending therefrom transversely of said chassis and having a selective gear reduction driving connection with said motor drive shaft, a caterpillar brush centrally mounted on said chassis, a debris storage hopper mounted at the forward end of said vehicle and arranged to have debris deposited therein by said caterpillar brush, a pair of intermediate sweeping equipment drive shafts geared to said transmission sweeping equipment drive shaft and extending forwardly along opposite sides of said chassis, a pair of intermediate vehicle drive shafts secured to said transmission vehicle drive shafts and extending forwardly along opposite sides of said chassis, drives from said intermediate sweeping equipment shafts to said caterpillar brush, and drives from said intermediate vehicle drive shafts to said front wheels.

RONALD CLEMENT EVANS.